United States Patent
Naruse et al.

(10) Patent No.: US 12,335,628 B2
(45) Date of Patent: Jun. 17, 2025

(54) IMAGING CONDITION SETTING SYSTEM, IMAGING CONDITION SETTING METHOD, AND PROGRAM

(71) Applicant: OMRON CORPORATION, Kyoto (JP)

(72) Inventors: Yosuke Naruse, Kyoto (JP); Koichi Taguchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/260,772

(22) PCT Filed: Sep. 14, 2021

(86) PCT No.: PCT/JP2021/033690
§ 371 (c)(1),
(2) Date: Jul. 7, 2023

(87) PCT Pub. No.: WO2022/163002
PCT Pub. Date: Aug. 4, 2022

(65) Prior Publication Data
US 2024/0305893 A1    Sep. 12, 2024

(30) Foreign Application Priority Data
Jan. 27, 2021    (JP) .................. 2021-011384

(51) Int. Cl.
*H04N 23/72*    (2023.01)
*G01N 21/88*    (2006.01)
(Continued)

(52) U.S. Cl.
CPC ......... *H04N 23/72* (2023.01); *G01N 21/8806* (2013.01); *H04N 23/73* (2023.01); *H04N 23/74* (2023.01); *G01N 2021/8835* (2013.01)

(58) Field of Classification Search
CPC ........ H04N 23/72; H04N 23/73; H04N 23/74; H04N 23/741; G01N 21/8806;
(Continued)

(56) References Cited

U.S. PATENT DOCUMENTS

| 7,394,530 B2* | 7/2008 | Budd ................. G01N 21/8851 356/237.1 |
| 8,018,525 B2 | 9/2011 | Trevelyan et al. |
| 2004/0207836 A1 | 10/2004 | Chhibber et al. |

(Continued)

FOREIGN PATENT DOCUMENTS

| CN | 110383805 A * | 10/2019 | ............. G01B 11/24 |
| DE | 102017221649 A1 * | 6/2019 | |

(Continued)

OTHER PUBLICATIONS

Extended Search Report Received in European Application No. 21923010, dated Nov. 12, 2024, 125 pages.

*Primary Examiner* — Tracy Y. Li
(74) *Attorney, Agent, or Firm* — Seed IP Law Group LLP

(57) ABSTRACT

An imaging condition setting system sufficiently reduces the effects of ambient light in designing optimized illumination patterns for imaging an inspection target. The system includes an imager that captures an image of a workpiece being the inspection target, an illuminator including a light source that illuminates the workpiece with light, and an imaging condition setter that sets an imaging condition to capture an image of the workpiece. The imaging condition setter sets, for the image captured with light from the illuminator to the workpiece at a luminosity greater than or equal to a threshold, an exposure time of the imager to cause a value of a pixel in a specific area of the image of the workpiece to be within a specific range.

14 Claims, 8 Drawing Sheets

(51) Int. Cl.
*H04N 23/73* (2023.01)
*H04N 23/74* (2023.01)

(58) Field of Classification Search
CPC ....... G01N 2021/8835; G01N 21/8851; G01N 2021/845; G03B 7/17; G03B 7/091; G03B 15/05
See application file for complete search history.

(56) References Cited

U.S. PATENT DOCUMENTS

| | | | |
|---|---|---|---|
| 2011/0058065 A1* | 3/2011 | Kiuchi | G06T 5/50 |
| | | | 348/E5.037 |
| 2011/0280470 A1 | 11/2011 | Hayashi | |
| 2013/0242152 A1* | 9/2013 | Kasai | H04N 25/447 |
| | | | 348/294 |
| 2015/0187060 A1 | 7/2015 | Hayashi | |
| 2015/0264278 A1 | 9/2015 | Kleekajai et al. | |
| 2015/0326771 A1* | 11/2015 | Maruyama | H04N 23/71 |
| | | | 348/336 |
| 2016/0373628 A1* | 12/2016 | Nakajima | H04N 5/58 |
| 2023/0239559 A1* | 7/2023 | DeRoos | H04N 23/74 |
| | | | 348/222.1 |

FOREIGN PATENT DOCUMENTS

| | | | | |
|---|---|---|---|---|
| JP | 2005003385 A | | 1/2005 | |
| JP | 2009182461 A | | 8/2009 | |
| JP | 2010239610 A | * | 10/2010 | .............. G06T 5/40 |
| JP | 2011237302 A | | 11/2011 | |
| JP | 2017135528 A | | 8/2017 | |
| JP | 6601264 B2 | | 11/2019 | |
| WO | WO 2020129140 A1 | | 6/2020 | |

* cited by examiner

IMAGING CONDITION SETTING SYSTEM, IMAGING CONDITION SETTING METHOD, AND PROGRAM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to an imaging condition setting system, an imaging condition setting method, and a program.

Description of the Related Art

The visual inspection of products at manufacturing sites remains as an area involving replacement of least human-power by machines, and is to be automated in response to the expected future decline in the workforce. The recent development of artificial intelligence and machine learning including deep learning has greatly improved automated inspection techniques.

For visual inspection and machine vision, the most laborious process in building an inspection system is designing an imaging system, including designing optimized illumination patterns. Such techniques have yet to be automated sufficiently. Such optimized illumination patterns manually designed by humans take great effort in designing an imaging system that reliably detects defects such as scratches on workpieces (inspection targets) with individual variations. More specifically, to achieve intended detection performance, a human operator alternately repeats optimization of illumination with manual adjustment and review and modification of the inspection algorithm while replacing various workpieces as inspection targets. This takes many work-hours.

A workpiece imaged for actual inspection is illuminated with illumination light and with ambient light that changes with the imaging environment. However, the simulation for designing optimized illumination patterns does not reflect the effects of ambient light. The image estimated by simulation thus has an error in brightness from the actual image caused by the luminosity of ambient light.

Such an error may be reduced by setting the luminosity of illumination light to be sufficiently greater than the luminosity of ambient light to reduce relative effects of the ambient light. However, greater luminous intensities are likely to cause saturation of pixels in images.

Patent Literature 1 describes a technique for pixel saturation. For any pixel of an image having a luminance value being saturated, multiple images captured with different emission luminance levels of light from illumination light sources are generated, and the sum of the luminance values of the corresponding pixels is calculated to generate a composite image.

CITATION LIST

Patent Literature

Patent Literature 1: Japanese Patent No. 6601264

SUMMARY

Technical Problem

With the known method described in Patent Literature 1, the luminosity of the illumination light for the workpiece is less than the maximum possible luminosity to avoid pixel saturation. The effects of ambient light are thus not reduced sufficiently relative to the illumination light, with a relatively large difference in brightness between the estimated image and the actual image.

In response to the above circumstances, one or more aspects of the present disclosure are directed to an imaging condition setting system that can sufficiently reduce the effects of ambient light in designing optimized illumination patterns for imaging an inspection target.

Solution to Problem

In response to the above, the technique according to one or more aspects of the present disclosure provides the structure described below.

An imaging condition setting system according to one aspect of the present disclosure includes an imager that captures an image of a workpiece being an inspection target, an illuminator including a light source that illuminates the workpiece with light, and an imaging condition setter that sets an imaging condition to capture an image of the workpiece. The imaging condition setter sets, for the image captured with light from the illuminator to the workpiece at a luminosity greater than or equal to a threshold, an exposure time of the imager to cause a value of a pixel in a specific area of the image of the workpiece to be within a specific range.

The above structure allows illumination light to be sufficiently brighter than ambient light in imaging an inspection target, thus reducing relative effects of ambient light.

The imaging condition setter may set, for the image captured with light from the illuminator to the workpiece at a maximum luminosity, the exposure time of the imager to cause the value of the pixel in the specific area of the image of the workpiece to be within the specific range. This allows illumination light to be brighter than ambient light by a maximum degree in imaging an inspection target, thus reducing the effects of the ambient light sufficiently.

The illuminator may include a plurality of light sources each with an adjustable luminosity. The imaging condition setter may set a luminosity of at least one of the plurality of light sources to a value greater than or equal to the threshold. This reduces the effects of ambient light using a multichannel illuminator with each channel while maintaining the luminosity in an optimal pattern.

In response to values of pixels being nonlinear with respect to exposure of the imager, the imaging condition setter may calibrate the imager before setting the exposure time. This allows the exposure time to be set independently of unknown characteristics of the imager.

The imaging condition setter may set the exposure time of the imager to cause the value of the pixel in the specific area of the image of the workpiece to be within the specific range based on a difference between an image captured with light from the illuminator to the workpiece at a luminosity greater than or equal to the threshold and an image captured with light from the illuminator to the workpiece at a minimum luminosity. This allows the exposure time to be set based on the image captured with light precisely from the illuminator alone.

The imaging condition setter may set the exposure time of the imager to cause the value of the pixel in the specific area of the image of the workpiece to be within the specific range based on differences between an image captured with light from the illuminator to the workpiece at a luminosity greater than or equal to the threshold and images captured with light from the illuminator to the workpiece at a minimum luminosity under a plurality of different ambient light conditions. This allows the exposure time to be set with robustness against the conditions of ambient light in imaging.

The imaging condition setter may set, for the image captured with at least one of a setting value of the luminosity of light from the illuminator to the workpiece, a measurement value of a luminosity of actual light from the illuminator to the workpiece, or a displayed luminosity on a display being greater than or equal to a predetermined threshold, the exposure time of the imager to cause the value of the pixel in the specific area of the image of the workpiece to be within the specific range. This allows the exposure time to be set based on one of the setting value, the measurement value, or the displayed value on the display as appropriate for the system configuration.

An imaging condition setting method according to another aspect of the present disclosure is implementable with a computer for determining an imaging condition to capture an image of a workpiece being an inspection target. The method includes setting, with the computer, a luminosity of light from an illuminator to the workpiece to a value greater than or equal to a threshold, capturing, with the computer, an image of the workpiece using an imager under a condition that the light is at the luminosity, and setting, with the computer, based on the captured image of the workpiece, an exposure time of the imager to cause a value of a pixel in a specific area of the image of the workpiece to be within a specific range. The above structure allows illumination light to be sufficiently brighter than ambient light in imaging an inspection target, thus reducing relative effects of ambient light.

A program according to another aspect of the present disclosure is executable by a computer for determining an imaging condition to capture an image of a workpiece being an inspection target. The program causes the computer to perform operations including setting a luminosity of light from an illuminator to the workpiece to a value greater than or equal to a threshold, capturing an image of the workpiece using an imager under a condition that the light is at the luminosity, and setting, based on the captured image of the workpiece, an exposure time of the imager to cause a value of a pixel in a specific area of the image of the workpiece to be within a specific range. The above structure allows illumination light to be sufficiently brighter than ambient light in imaging an inspection target, thus reducing relative effects of ambient light.

Advantageous Effects

The imaging condition setting system according to the above aspects of the present disclosure can sufficiently reduce the effects of ambient light in designing optimized illumination patterns for imaging an inspection target.

DETAILED DESCRIPTION

One or more embodiments of the present disclosure (hereafter, the present embodiment) will now be described with reference to the drawings. The embodiments described below are mere examples in any respect. The embodiments may be variously modified or altered without deviating from the scope of the present disclosure. More specifically, the present disclosure may be implemented as appropriate using the configuration specific to each embodiment. Although data used in the embodiments is described in a natural language, such data may be specifically defined using any computer-readable language, such as a pseudo language, commands, parameters, or a machine language.

Example Use

Figure 1:
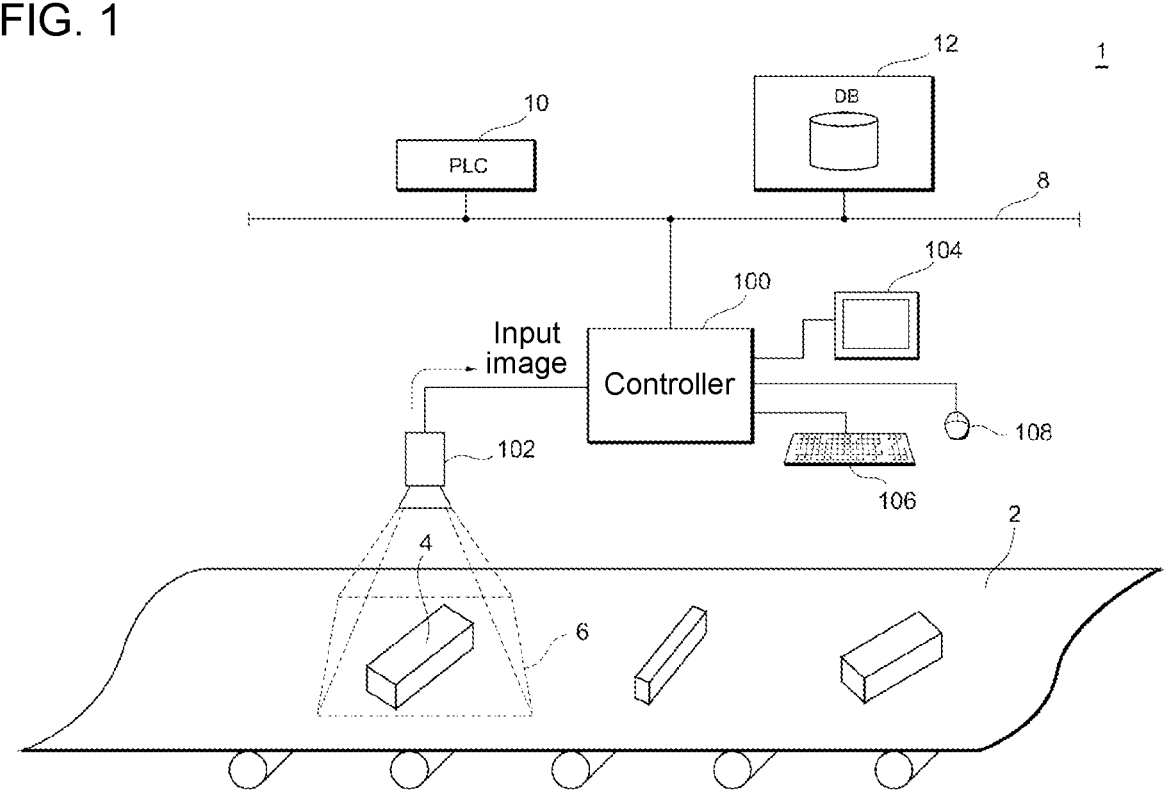
FIG. 1 is a schematic diagram of an inspection system according to an embodiment of the present disclosure.
Figure 2:
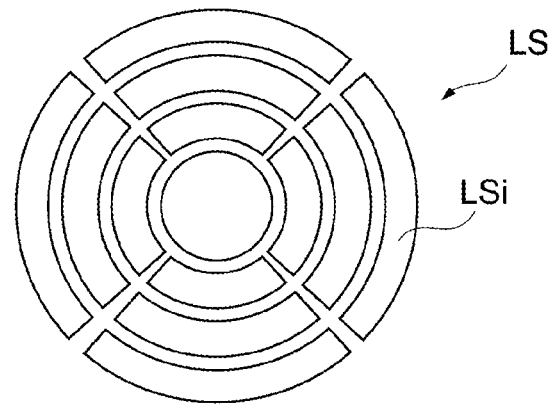
FIG. 2 is a schematic plan view of a light source in an example arrangement used in the inspection system according to the embodiment of the present disclosure.

An example use of the technique according to an embodiment of the present disclosure will be described with reference to FIG. 1. FIG. 1 is a schematic diagram of an inspection system (imaging condition setting system) 1 according to an embodiment of the present disclosure. FIG. 2 is a schematic plan view of a light source in an example arrangement used in the inspection system 1.

The inspection system 1 performs visual inspection of a workpiece 4 by analyzing an input image obtained by imaging the workpiece 4 as an inspection target transported on, for example, a belt conveyor 2. In a typical example described below, image analysis is used to inspect any defect on the surface of the workpiece 4. However, image analysis may also be used to, for example, identify the type of a defect and measure the external shape.

A camera 102 as a sensor integral with a light source LS is located above the belt conveyor 2. The camera 102 has an imaging field 6 including a predetermined area of the belt conveyor 2. The light source LS is, for example, a multichannel illuminator such as a Multi Direction/Multi Color (MDMC) illuminator, or more specifically, an illuminator described in, for example, Japanese Patent Application No. 2018-031747 filed by the same applicant as the present application. The light source LS as a multichannel illuminator includes multiple channel illuminators LSi. More specifically, the light source LS includes, as shown in the example of FIG. 2, a single circular channel illuminator LSi in a plan view and twelve fan-shaped channel illuminators LSi concentrically surrounding the single circular channel illuminator LSi. In this example, the light source LS includes a total of thirteen channel illuminators LSi. For each channel illuminator LSi emitting three colors of light, the light source LSi has 13×3=39 default emission patterns that are monochromatic and single-channeled. The camera 102 performs imaging to generate workpiece image data for evaluation, which is transmitted to the controller 100. The camera 102 performs imaging periodically or at events.

The controller 100 causes the light source LS to emit light in multiple emission patterns for evaluation based on an illumination command value being a discrete value and captures multiple evaluation workpiece images of at least one workpiece illuminated with the multiple emission patterns. The controller 100 simulates, based on the multiple evaluation workpiece images, the emission patterns by changing a parameter including continuous values and calculates a parameter representing an emission pattern for identifying the state of a workpiece. The parameter is a weight parameter for generating a composite image by superimposing multiple evaluation workpiece images on one another. The controller 100 converts the parameter to an illumination command value by referring to an illuminance LUT.

The controller 100 uses the calculated illumination command value to capture an inspection image of the workpiece 4 as an inspection target. The controller 100 may also include a learner including a convolutional neural network (CNN) engine for visual inspection of the workpiece 4. The CNN engine is used to generate, from the inspection image, one or more feature detection images for each class. The generated feature detection images are used to identify the state (e.g., any defect, the size of a defect, or the position of a defect) of the workpiece 4 as an inspection target.

The controller 100 is connected to a programmable logic controller (PLC) 10, a database 12, and other devices with a host network 8. The controller 100 yields computation results and detection results, which may be transmitted to the PLC 10, the database 12, or both. In addition to the PLC 10 and the database 12, any device may be connected to the host network 8. The controller 100 may be connected to an output device such as a display 104 for displaying, for example, the status during processing and the detection results and to input devices such as a keyboard 106 and a mouse 108 for receiving an operation performed by a user.

In one or more embodiments of the present disclosure, the inspection system 1 illuminates a workpiece to be inspected (inspection target) with an inspection emission pattern based on an illumination command value that is a discrete value, and images the workpiece with an appropriate sensor to obtain workpiece images for inspection. The inspection workpiece images then undergo image processing for identifying the state of the workpiece (e.g., any defect such as a scratch).

The inspection system 1 pre-captures multiple evaluation workpiece images of at least one workpiece to determine an emission pattern optimized for workpiece inspection. The inspection system then generates a composite image by superimposing the multiple evaluation workpiece images weighed with the parameter including continuous values and evaluates the composite image using a predetermined evaluation function to calculate the parameter representing an emission pattern appropriate for identifying the state of the workpiece. The inspection system 1 converts the parameter to an illumination command value by referring to a table showing illumination command values and their corresponding parameters.

The inspection system 1 eliminates the effects of ambient light to improve the accuracy of matching between the resultant composite image and the image of the workpiece captured under the actual inspection conditions. More specifically, the inspection system 1 controls, while controlling each channel illuminator LSi in the light sources LS to emit light at a luminosity matching the optimized emission pattern, at least one channel illuminator LSi to emit light at a maximum luminosity. Although the relative effects of ambient light can be reduced with light of a maximum luminosity, the captured image can partly have pixel saturation. The inspection system 1 thus adjusts the exposure time or gain of the camera 102 with the maximum luminosity and searches for the optimal exposure time that causes no pixel saturation.

Example Structure

Hardware Configuration

Figure 3:
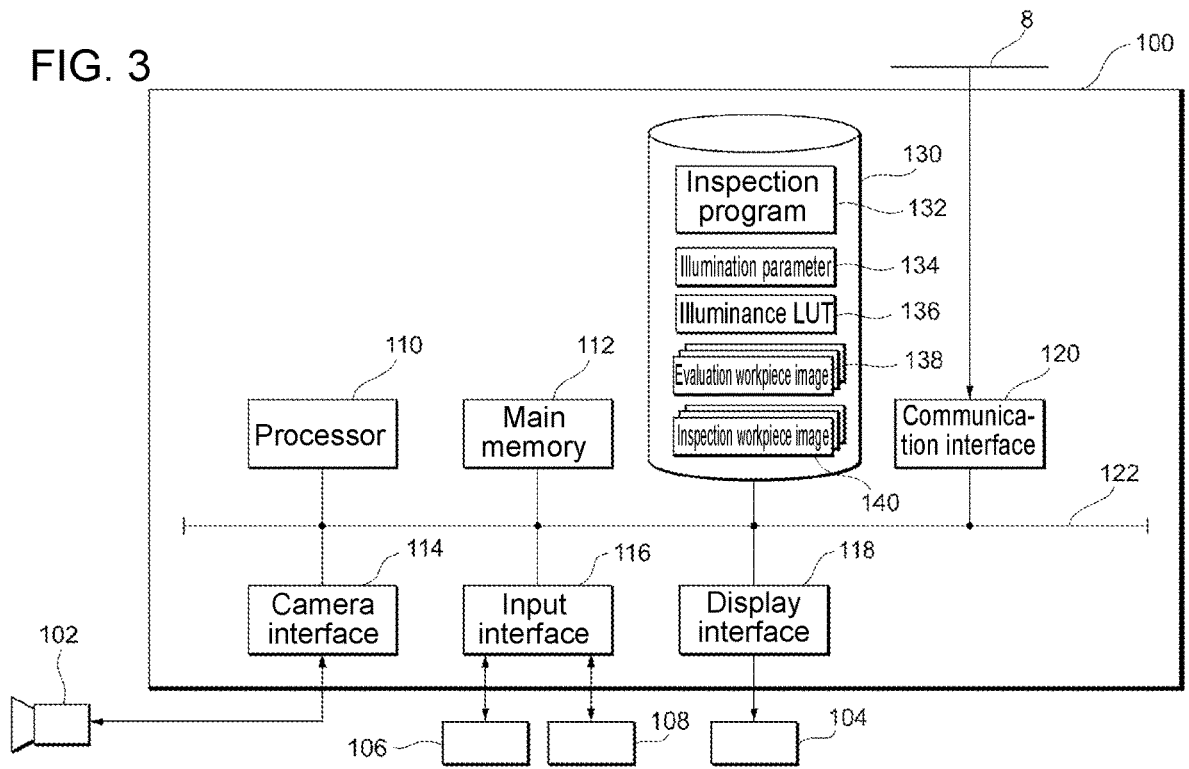
FIG. 3 is a schematic diagram of a controller included in the inspection system according to the embodiment of the present disclosure, showing the hardware configuration.

An example hardware configuration of the controller 100 included in the inspection system 1 according to one embodiment of the present disclosure will now be described with reference to FIG. 3. FIG. 3 is a schematic diagram of the controller 100 showing its hardware configuration.

The controller 100 is, for example, a general-purpose computer having a general-purpose computer architecture. The controller 100 includes a processor 110, a main memory 112, a camera interface 114, an input interface 116, a display interface 118, a communication interface 120, and a storage 130. Typically, these components are connected to one another with an internal bus 122 to allow communication between them.

The processor 110 loads various programs stored in the storage 130 into the main memory 112 and executes the programs to implement the functions and processing described later. The main memory 112, which is a volatile memory, serves as a workplace memory used by the processor 110 to execute the programs.

The camera interface 114 is connected to the camera 102 to obtain evaluation workpiece images 138 and inspection workpiece images 140 captured with the camera 102. The camera interface 114 may indicate, for example, the imaging timing to the camera 102.

The input interface 116 is connected to the input units such as the keyboard 106 and the mouse 108 to obtain a command indicating, for example, an operation performed on the input units by the user.

The display interface 118 outputs, to the display 104, various processing results generated by the processor 110 executing the programs.

The communication interface 120 is used for communication with the PLC 10, the database 12, and other devices through the host network 8.

The storage 130 stores a program, such as an operating system (OS) or an inspection program 132, for causing a computer to function as the controller 100. The storage 130 may further store an illumination parameter 134, an illuminance LUT 136, multiple evaluation workpiece images 138, and multiple inspection workpiece images 140. The illumination parameter 134 is a parameter including continuous values having dimensions equal to the number of evaluation workpiece images. The parameter is weighted to generate a composite image including the multiple evaluation workpiece images 138 superimposed on one another. The illuminance LUT 136 is a table showing illumination command values and their corresponding illuminance levels.

The inspection program 132 stored in the storage 130 may be installed into the controller 100 with an optical recording medium such as a digital versatile disc (DVD) or a semiconductor recording medium such as a universal serial bus (USB) memory. In some embodiments, the inspection program 132 may be downloaded from, for example, a server on a network.

For the controller 100 implemented with such a general-purpose computer, some of the functions in the present embodiment may be implemented with intended software modules provided by the OS being invoked and processed at least in a predetermined order or at predetermined timing. More specifically, the inspection program 132 in the present embodiment may not include all the software modules for implementing the functions in the present embodiment, and may provide intended functions in cooperation with the OS.

The inspection program 132 may be provided as a part of another program. In this case as well, the inspection program 132 does not include modules included in the other program to be combined with the inspection program 132, and performs processing in cooperation with the other program. In the manner described above, the inspection program 132 in the present embodiment can be a part of another program.

In the example of FIG. 3, the controller 100 is implemented using a general-purpose computer. In another example, all or some of the functions may be implemented using a dedicated circuit, or for example, an application-specific integrated circuit (ASIC) or a field-programmable gate array (FPGA). Some processes may be performed by an external device connected to the network.

As described above, the inspection system 1 as a piece of hardware corresponds to an example of an inspection system in an aspect of the present disclosure. The workpiece 4 corresponds to an example of a workpiece in an aspect of the present disclosure. The light source LS corresponds to an example of a light source in an aspect of the present disclosure. The camera 102 corresponds to an example of a camera in an aspect of the present disclosure.

Functional Components

Figure 4:
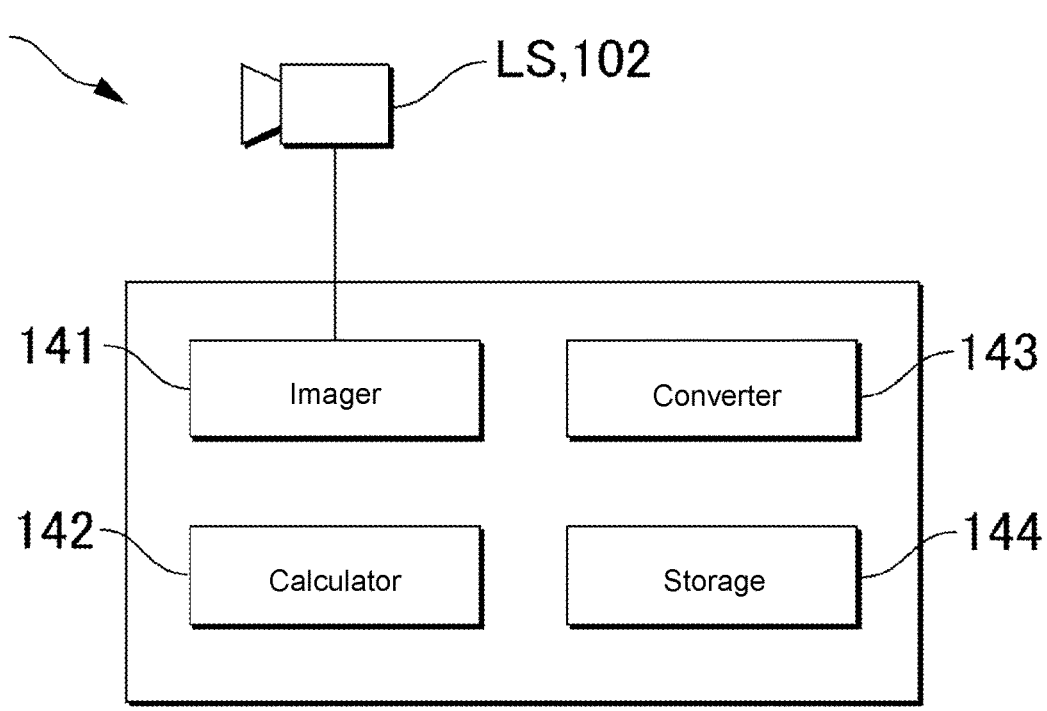
FIG. 4 is a schematic diagram of the inspection system according to the embodiment of the present disclosure, showing example functional components.

The functional components of the inspection system 1 according to the embodiment of the present disclosure will now be described below with reference to FIG. 4. FIG. 4 is a schematic diagram of the inspection system 1 according to the embodiment of the present disclosure, showing the functional components. The controller 100 in the inspection system 1 may include an imager 141, a calculator 142, a converter 143, and a storage 144.

The imager 141, the calculator 142, and the converter 143 in the controller 100 may be implemented using a general-purpose processor. In some embodiments of the present disclosure, the functions of all or some of these components may be implemented using a dedicated circuit (e.g., ASIC or FPGA). Some processes may be performed by an external device connected to the network.

The imager 141 causes the light source LS to emit light in multiple evaluation emission patterns based on an illumination command value being a discrete value and causes the camera 102 to capture multiple evaluation workpiece images of at least one workpiece illuminated with the light. The imager 141 may capture N evaluation workpiece images.

The calculator 142 simulates, based on the multiple evaluation workpiece images, the emission patterns by changing the parameter including continuous values and calculates the parameter representing the emission pattern for identifying the state of the workpiece. The calculator 142 generates a composite image by superimposing the multiple evaluation workpiece images weighed with the parameter having dimensions equal to the number of evaluation workpiece images and evaluates the composite image with a predetermined evaluation function to calculate the parameter representing the emission pattern for identifying the state of the workpiece.

The converter 143 converts the calculated parameter to an illumination command value. The converter 143 converts the parameter to the illumination command value based on the illuminance LUT showing illumination command values and their corresponding parameters.

The storage 144 stores, in the phase of illumination optimization, multiple evaluation workpiece images obtained with the imager 141 and stores, in the phase of inspection, the inspection workpiece images obtained with the imager 141. The storage 144 stores the illumination parameter obtained with the calculator 142. The storage 144 stores the illuminance LUT used by the converter 143. The storage 144 is implemented with the storage 130 that stores programs or data for the operation of the inspection system 1. The controller 100 may eliminate the storage 144 and may use, in place of the storage 144, an external storage.

As described above, the controller 100 as a functional module corresponds to, together with the light source LS and the camera 102, an example of an imager in an aspect of the present disclosure. The controller 100 also functions as examples of a calculator and a converter in an aspect of the present disclosure.

Operation Examples

Table 1 lists the symbols in the formulas used in describing the operation example and their meanings. Bold lowercase letters indicate vectors, and bold uppercase letters indicate matrices (not in bold in the text). The other symbols are scalars. The symbol $\|\ \|$ indicates the L2 norm for the vector, and $[X]_{i,j}$ indicates the elements in i-row and j-column in matrix X.

TABLE 1

| Meaning | Symbol |
|---|---|
| The number of illumination channels | K |
| The number of workpiece images for evaluation (for teaching) captured with different emission patterns (=the number of base emission patterns) | N |
| Emission pattern for evaluation (for teaching) (=base emission pattern) | $h_k (1 \leq k \leq K)$ H (arranged horizontally) |
| Workpiece image captured with $h_i$ | $f_i (1 \leq i \leq N)$ f (arranged vertically) |

TABLE 1-continued

| Meaning | Symbol |
|---|---|
| Image composition weight | $w_i (1 \leq i \leq N)$ |
| | w (arranged in a vertical vector) |
| Ambient light image (image captured with all illumination CHs at a minimum luminous intensity) | z |
| Emission intensity for each illumination CH (=illuminance) | $u_k (1 \leq k \leq K)$ |
| | u (arranged in a vertical vector) |
| Predetermined exposure time | T |
| Exposure time in workpiece imaging | $T_n (1 \leq n \leq N)$ |
| Exposure time in imaging with ambient light | $T_z$ |
| Clamp level | d |
| The number of evaluation workpieces for illumination optimization (teaching) | M |

Equivalence of Imaging with Multichannel Illuminator to Inner Product Computation The inspection system 1 uses the imager 141 with a multichannel illuminator as the light source LS. In this example, the assumption of linearity holds for the sensor in the inspection system 1 (linearity between luminance and quantitation limit (QL) value). This indicates that the linearity holds in a system including signal processing such as color filter demosaicing and imaging correction such as gamma correction and dark current offset correction. To avoid nonlinearity resulting from pixel saturation, high dynamic range (HDR) imaging may be used to generate a composite image. In this case, the workpiece 4 is imaged while being illuminated by K channel illuminators LSi. The emission intensity of each channel illuminator is expressed as a vector of Formula 1 below.

$$u = (u_1, u_2, \ldots, u_K)^T, u_k \geq 0 \quad (1)$$

A captured image g captured under an illumination condition u can be modeled through composite image generation as with Formula 2 below, where $f_i$ is a column vector of images captured with an i-th illuminator alone being turned on at a predetermined intensity, and the others being turned off, as indicated by $u_i=1$ and $u_j=0 (j \neq i)$.

$$g = \sum_{i=1}^{K} u_i f_i = (u^T \otimes I) f' \quad (2)$$

In the formula, f' is a multichannel image (a large column vector) of K images arranged vertically, as defined by Formula 3 below.

$$f' = \sum_{i=1}^{K} e_i \otimes f_i \quad (3)$$

The operators in Formulas 2 and 3 are defined in the manner described below.
⊗: Kronecker product
$e_i$: Standard basis of
i: Unit matrix (4)

The optimization of the multichannel illuminator is thus equivalent to generating a feature vector g with the inner product computation based on f' of the original image, or more specifically, to designing an optimized linear projection direction u in a projection matrix $u^T \times I$ (where × is the Kronecker product).

Obtaining Evaluation Images with Default Emission Pattern

In the example described below, a single workpiece illuminated with K illuminators is imaged in N different emission patterns to determine (teach) optimal illumination.

The emission pattern for an n-th $(1 \leq n \leq N)$ image is defined as in Formulas 5.

$$h_n = (h_{1,n}, h_{2,n}, \ldots, h_{K,n})^T, h_{k,n} \geq 0 \quad (5)$$
$$H = [h_1, h_2, \ldots, h_N]$$

The workpiece is imaged with these emission patterns to reproduce a captured image of the workpiece illuminated with any emission pattern. This is equivalent to estimating a light transport (LT) matrix. Typically, to obtain all degrees of freedom of an LT matrix, the emission pattern may be determined to have a linearly independent pattern $h_n$. To fully use all the degrees of freedom of K illuminators, at least N=K and the rank of H or rank (H)=min(N, K) is to be a full rank.

When N<K, the degrees of freedom of the number of illuminators cannot be used sufficiently. However, the imaging time for the workpiece may be effectively shortened. This may be achieved with various methods, including estimation of an LT matrix by compressed sensing.

When N>K, the number of images is more than intended to fully use the degrees of freedom of illuminators and thus is wasteful. However, N>K may be selected for other purposes such as increasing the signal-to-noise ratio or the dynamic range.

A multichannel image vector including N images arranged vertically is defined as in Formula 6, where $f_i$ is a column vector of images captured with these emission patterns, and $e_i$ is the standard basis of $R^N$.

$$f' = \sum_{i=1}^{K} e_i \otimes f_i \quad (6)$$

The luminance u of each illumination channel and the image g captured at the luminance are expressed with Formulas 7 below.

$$u = Hw, w = (w_1, w_2, \ldots, w_N)^T \quad (7)$$
$$g = \sum_{i=1}^{K} w_i f_i = (w^T \otimes I) f'$$

In the formula, $w_i$ is the image composition weight (illumination parameter). Although the command value for the emission intensity is calculated based on the image composition weight, the calculated value is not used without being processed. Typically, the image composition weight is allowed to be a negative value. However, the emission intensities of the illumination channels to be non-negative values are subject to the condition in Formula 8 below.

$$Hw \geq 0 \qquad (8)$$

In the formulas, the inequalities for vectors and matrices are the inequalities for all the elements. When H=I, or more specifically, when K (=N) images are captured with illuminators being turned on one by one, u and w are equivalent. In the example below, an optimal image composition weight w is determined to determine the optimal illumination u for the optimal weight.

Evaluation Criterion for Illumination Optimization

In the example below, the meaning of illumination optimization and the evaluation criterion for the optimization will first be described briefly, and then the specific procedure will be described with reference to, for example, the drawings. The illumination for visual inspection of, for example, workpieces is designed to allow correct identification of the workpieces between an acceptable product (normal product) and an unacceptable product (defective product). This problem, which has been solved manually by skilled operators, may be solved systematically by predetermining a determination criterion and the degrees of freedom for controlling illumination design in a limited manner.

When the determination criterion predetermined with a predetermined determination algorithm and the degrees of control freedom is predetermined with a multichannel illuminator such as an MDMC illuminator, the problem of illumination optimization is formulated as a cross entropy minimization problem for matching the categorization between an acceptable product and an unacceptable product with a ground truth. When a machine learning-based learner is used as a determiner for determining the label of a workpiece, illumination optimization and training of the determiner may be performed at the same time to achieve automatic tuning that allows the highest performance for both the optimization and the training.

However, cross-entropy minimization uses numerous samples labeled as acceptable or unacceptable. In particular, for optimization of an illuminator with high degrees of freedom, the criterion for identifying a few acceptable or unacceptable labels may not allow unique determination of optimal illumination. Such an issue is particularly noticeable at setting up of an inspection system at which not many evaluation workpiece images (sample images) are available.

In response to this issue, illumination is optimized based on the evaluation criteria (contrast, brightness, and closeness) of an image in one or more embodiments of the present disclosure. In this case, the optimized design of illumination for visual inspection of, for example, workpieces typically includes the two conditions described below.

Condition 1: Facilitating viewing of features that allow easy identification between an acceptable product (label) and an unacceptable product (label) (specifically, facilitating viewing of defects)

Condition 2: Causing variations in acceptable products (variations in individual products) to be less viewable Illumination optimization is to be designed to balance between the above two typically contradictory conditions. In the example described below, an evaluation criterion that satisfies these conditions is used to determine the solution under constraints in which the emission intensity of illumination is a positive value. The evaluation criterion is thus used as discriminant analysis, and the evaluation criterion for images is expressed in a quadratic form. In this case, the problem can be solved by semidefinite programming (SDP).

Independently of an evaluation criterion, the evaluation function for illumination optimization can be expressed as minimization of a function F that uses an input of M workpiece images as in Formulas 9 below. This optimization yields an image composition weight (illumination parameter) $w_i$. This indicates the luminosity of the i-th base emission pattern, which is a discrete quantity resulting from the illumination command value being discrete. In this example, however, the value undergoes continuous relaxation to be a continuous quantity.

$$w_{opt} = \arg\min_{w} F(g_1, g_2, \ldots, g_M), \qquad (9)$$

$$\text{subject to: } Hw \geq 0$$

$$g_m = \sum_{i=1}^{N} w_i f_{m,i} = (w^T \otimes I) f'_m$$

Figure 5:
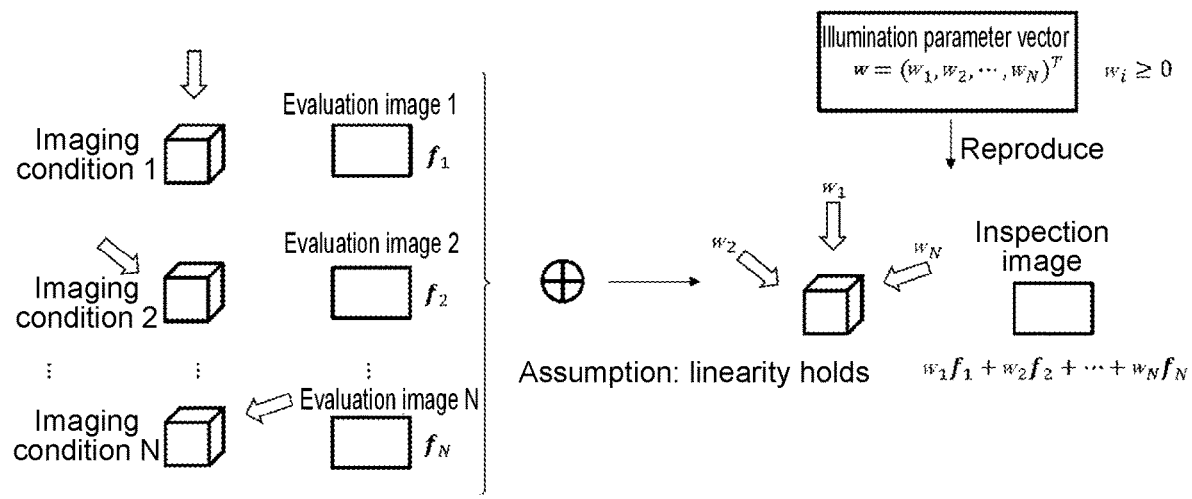
FIG. 5 is a schematic diagram of a model for composite image generation with the assumption of linearity holding in a single-shot inspection using a multichannel illuminator in the embodiment of the present disclosure.

FIG. 5 is a schematic diagram of a model for composite image generation with the assumption of linearity holding in a single shot inspection using a multichannel illuminator in one or more embodiments of the present disclosure.

This optimization allows searching with continuous quantities of less dimensions with w rather than with u, and thus is solved efficiently. An optimal image composition weight $w_{opt}$ is hereafter denoted as w.

Adjusting Exposure Time

In the example below, automatic exposure control (AEC) imaging and high dynamic range (HDR) imaging are described as methods for adjusting exposure time. Both the imaging methods are performed with an exposure time $t_n$ that avoids pixel saturation in the region of interest (ROI) in the image when the workpiece is illuminated with a base emission pattern. An image captured with an exposure time $t_r$ is used as a base image.

AEC imaging first sets a target image brightness (target pixel value $y_t$) and captures an image with a predetermined exposure time to extract an image $S_n$ of the ROI. AEC imaging calculates the exposure time $t_r$ for converting a maximum pixel value $y_m$ (attention pixel value) of the pixels included in the image $S_n$ to the target pixel value $y_t$. The target pixel value $y_t$ is set to a value between a threshold $y_{min}$ at which black clipping of pixels occurs and a threshold $y_{max}$ at which pixel saturation occurs.

The exposure time $t_r$ for conversion to the target pixel values $y_t$ is calculated based on a camera response function (CRF). In this example, the CRF is a known value. The CRF represents the relationship between luminosity and pixel values. With a CRF f(i, t), the pixel value y is expressed with the general formula below.

$$y = f(i, t) + d,$$

where i is illuminance, t is exposure time, and d is dark current offset.

The CRF f(i, t) can be expressed as f(i)*t, a*i*t (a is a coefficient representing a weight) when the camera has a characteristic of the luminosity being linear with respect to the exposure time, and as f(i*t), i*f(t), $f_1(i)*f_2(t)$ when the luminosity is nonlinear with respect to the exposure time.

Figure 6:
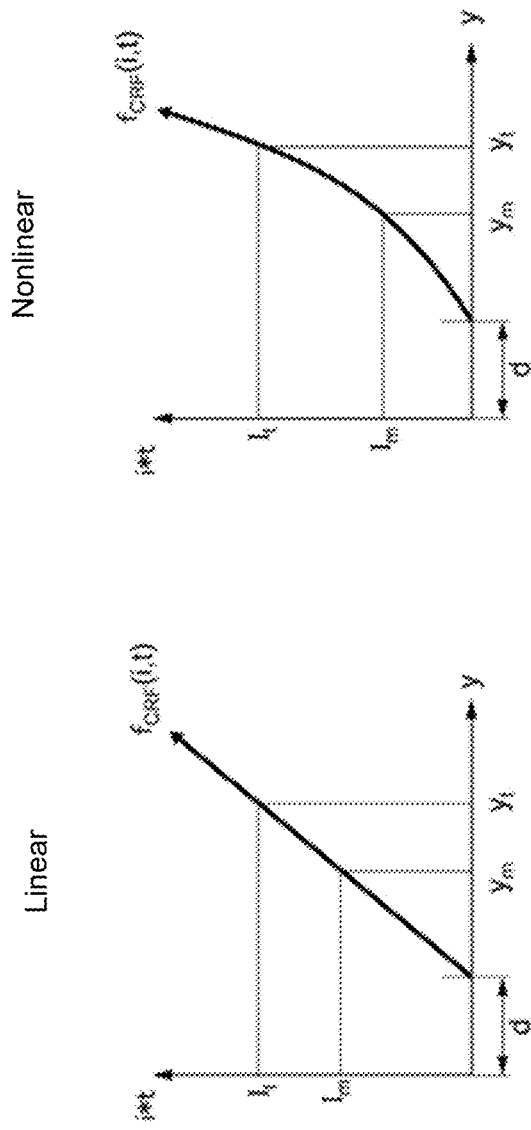
FIG. 6 is a diagram of graphs of CRFs showing linear and nonlinear relationships between luminosity and pixel values in the embodiment of the present disclosure.

The graphs in FIG. 6 show CRFs $f_{CRF}(i, t)$ for linear and nonlinear relationships between luminosity I and pixel values y. In the graphs, $y_m$ is the attention pixel value, $y_t$ is the target pixel value, $t_m$ is the exposure time of the attention pixel value, and $t_t$ is the exposure time for obtaining the target pixel value.

The procedure for obtaining the exposure time $t_t$ for obtaining the target pixel value to be finally determined will now be described. A luminosity $I_m$ is first calculated with the formula below using the attention pixel value $y_m$.

$$y_m = f^{-1}CRF(y_m - d)$$

Using the target pixel value $y_t$, a luminosity $I_t$ is calculated with the formula below.

$$y_m = f^{-1}CRF(y_t - d)$$

Subsequently, $t_t=t_t/I_m$ is calculated.
$T_t$ can be expressed with the formula below.
(For linear relationship)

$$(y_t - d)/(y_m - d)t_m$$

(For nonlinear relationship)

$$f^{-1}CRF(y_t - d) \cdot t_m / f^{-1}CRF(y_m - d)$$

In this example, d (the pixel value for the luminosity being zero) is assumed to be a constant value. When this assumption does not hold, a correction process is to be performed.

AEC imaging repeatedly captures images with a predetermined exposure time and obtains the exposure time $t_t$ with which the maximum pixel value (attention pixel value) $y_m$ reaches the target pixel value $y_t$.

HDR imaging first captures an image with a minimum exposure time and calculates, based on the CRF, the exposure time $t_t$ with which the pixel value $y_m$ of the pixel with the maximum pixel value in the image reaches the target pixel value $y_t$. The same process is then repeated for the remaining pixels to calculate, for all the pixels, the exposure time $t_t$ with which the pixels reaches the target pixel value $y_t$.

General Formula for Composite Image Generation for Variable Exposure Time

A method for generating a composite image from images having an exposure time T that is different from an exposure time $T_n$ of the captured base image will now be described. The composite image generation in this case is calculated with Formula 10 below. The formula below is used to generate a composite image from n (1≤n≤N) images captured with base emission patterns, where $f_n$ is an image captured with an n-th base emission pattern, $W_n$ is a composition weight for each image, T is a predetermined exposure time, and $T_n$ is the exposure time for imaging a workpiece illuminated with the n-th base emission pattern.

$$g_m = \sum_{n=1}^{N} \frac{T}{T_n} w_n(f_n - d) + d \quad (10)$$

The difference from when the exposure time is invariant is that the base image is converted to the luminosity with respect to the unit exposure time to reproduce the image with the predetermined exposure time T. In this example, the CRF of the camera is assumed to be linear. When the CRF is not linear, a correction process is to be performed.

Correction of Luminosity Based on Ambient Light Image

Ambient light is one cause of the difference between the brightness of the actually captured image and the brightness of the composite image of base images. To reduce the effects of ambient light, the structure in the present embodiment increases the luminosity of illumination to reduce relative effects of ambient light. To further improve accuracy, the luminosity of the ambient light contained in the base images are corrected based on the image (ambient light image) of the workpiece captured with the illumination being turned off. Composite image generation including the correction of the luminosity based on the ambient light image is calculated with Formula 11 below, where n (1≤n≤N) is the number of images captured with base emission patterns, $f_n$ is the image captured with an n-th base emission pattern, $w_n$ is the composition weight for each image, T is a predetermined exposure time, and $T_n$ is the exposure time for imaging the workpiece illuminated with the n-th base emission pattern.

$$g_m = \sum_{n=1}^{N} \frac{T}{T_n} w_n(f_n - i_n) + i_\tau \quad (11)$$

The luminosity correction in Formula 11 includes converting the base images and the ambient light image to the luminosity common to the images before reconstructing the image, where $i_n$ is the ambient light image resulting from conversion to the exposure time for imaging each base image, and $i_t$ is the ambient light image resulting from conversion to the exposure time for images to be a composite image. These ambient light images are expressed with Formulas 12 below based on a reference ambient light image z. In the formulas below, $f_z$ is the image captured with each illumination channel at the minimum luminosity, and $T_z$ is the exposure time for imaging with ambient light.

$$i_n = \frac{T_n}{T_z}(f_z - d) + d \quad (12)$$

$$i_\tau = \frac{T}{T_z}(f_z - d) + d$$

The process from determination of illumination conditions (teaching phase) to inspection of a workpiece under the determined illumination conditions (inspection phase) performed by the inspection system 1 according to the present embodiment will now be described with reference to the flowchart in FIG. 7.

Figure 7:
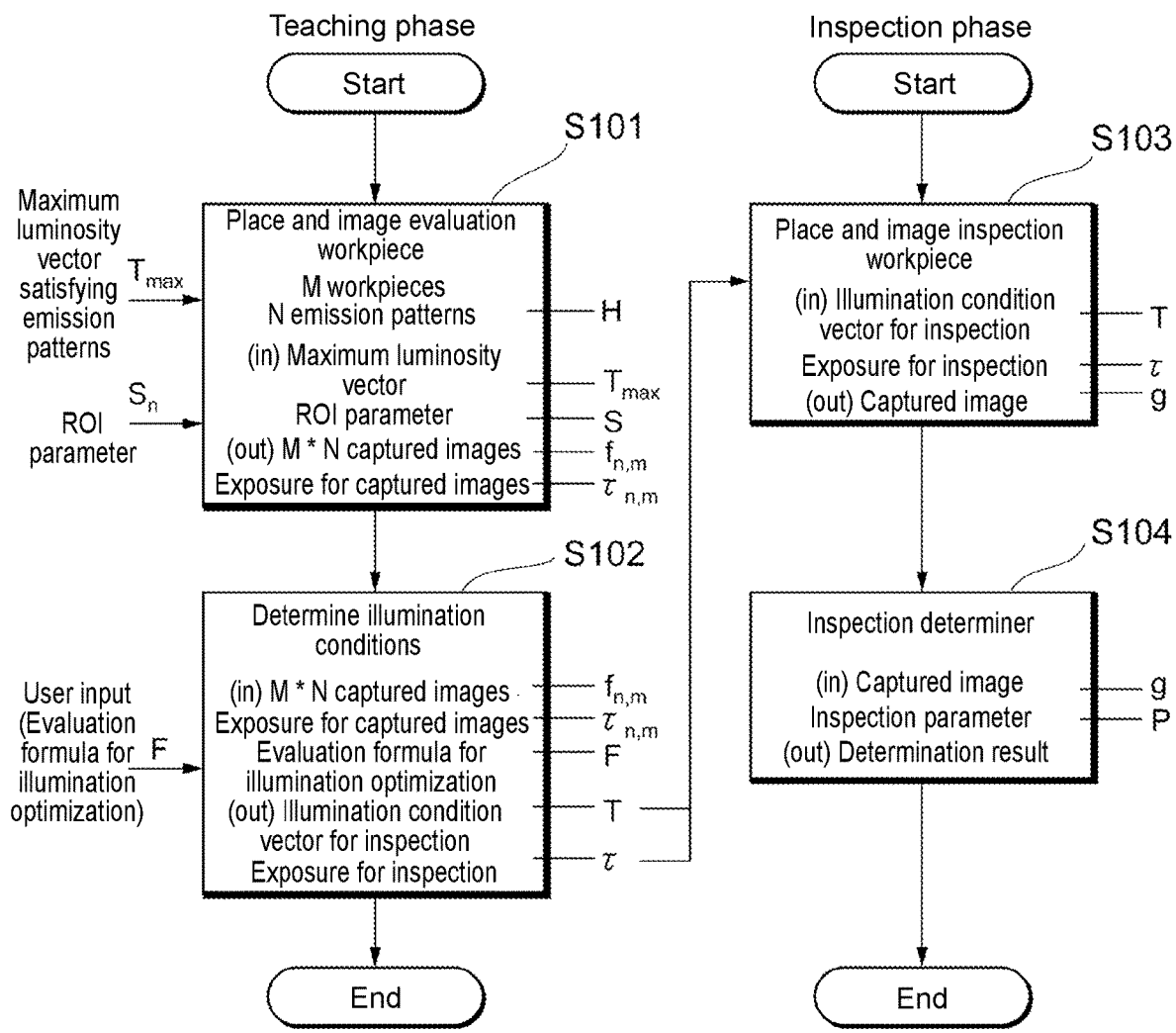
FIG. 7 is a flowchart of a process from determination of illumination conditions for the inspection system according to the embodiment of the present disclosure to inspection of a workpiece under the determined illumination conditions.

In the teaching phase, as shown in FIG. 7, the inspection system 1 illuminates M workpieces at the luminosity in accordance with a maximum luminosity vector $T_{max}$ that satisfies each of N emission patterns and captures N×M evaluation images $f_{n,m}$ (S101). The inspection system 1 performs imaging with an exposure time $T_{n,m}$ that causes no pixel saturation in the ROI of each image $f_{n,m}$. The exposure time for the images $f_{n,m}$ is denoted as $T_{n,m}$.

The inspection system 1 then determines illumination conditions (S102). The inspection system 1 receives an input of an evaluation formula F for illumination optimization from the user, evaluates, with the evaluation formula F, the N×M evaluation images $f_{n,m}$ and the exposure time $T_{n,m}$ for each image $f_{n,m}$, and determines an optimal illumination condition vector T and an optimal exposure time T.

In the inspection phase, the inspection system 1 captures a workpiece image for inspection (S103). The inspection system 1 illuminates the workpiece using the illumination condition vector T and the exposure time T calculated in the teaching phase and captures an image g for inspection.

The inspection system 1 inputs the captured inspection image into an inspection determiner (e.g., a determiner using a CNN) and outputs a determination result based on an inspection parameter P (S104).

Figure 8:
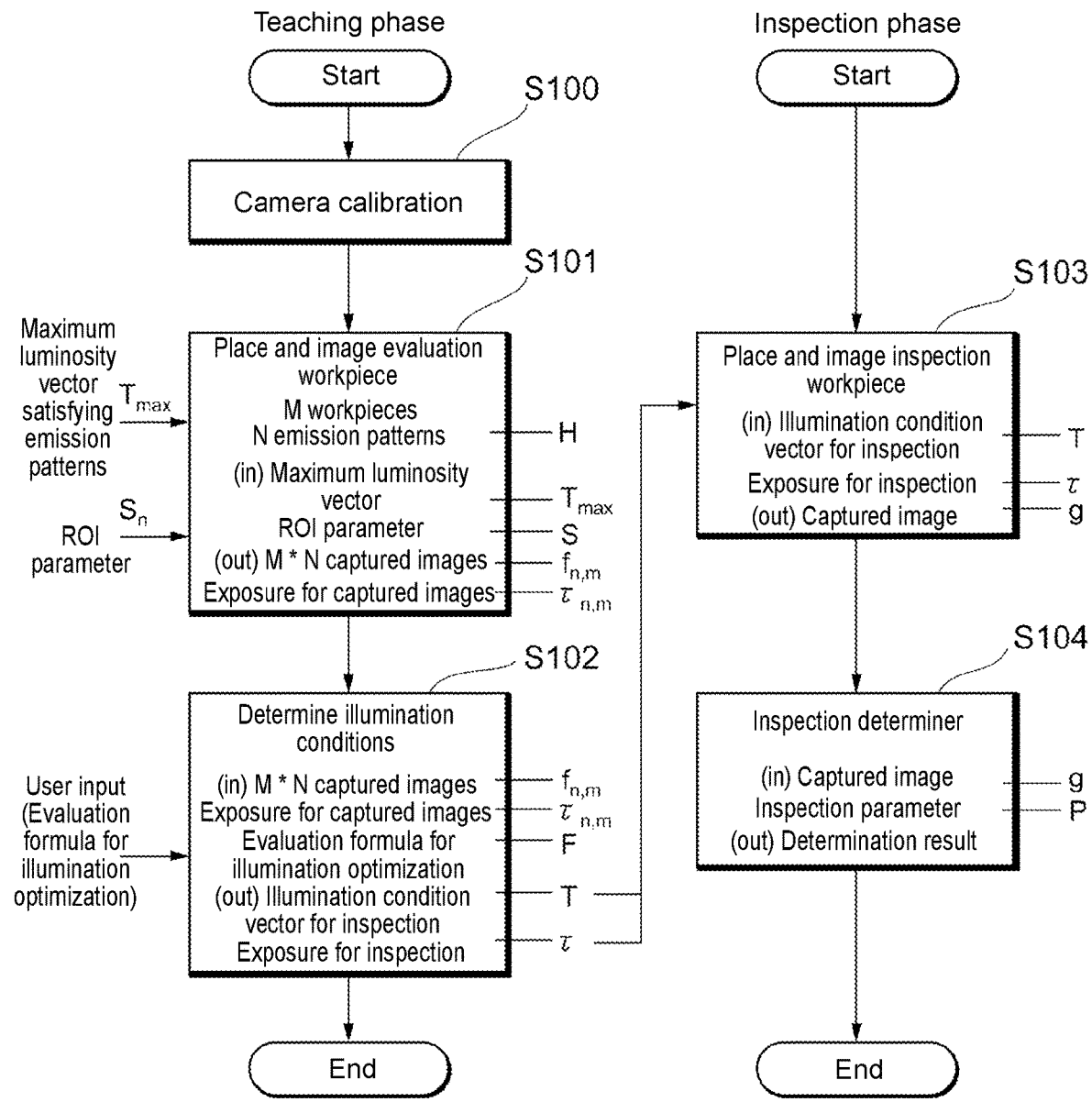
FIG. 8 is a flowchart of a process from determination of illumination conditions for the inspection system according to the embodiment of the present disclosure to inspection of a workpiece under the determined illumination conditions.

For the camera with a nonlinear CRF, as shown in the flowchart in FIG. 8, camera calibration is performed at the beginning of the teaching phase (S100). Evaluation images are then captured.

Figure 9:
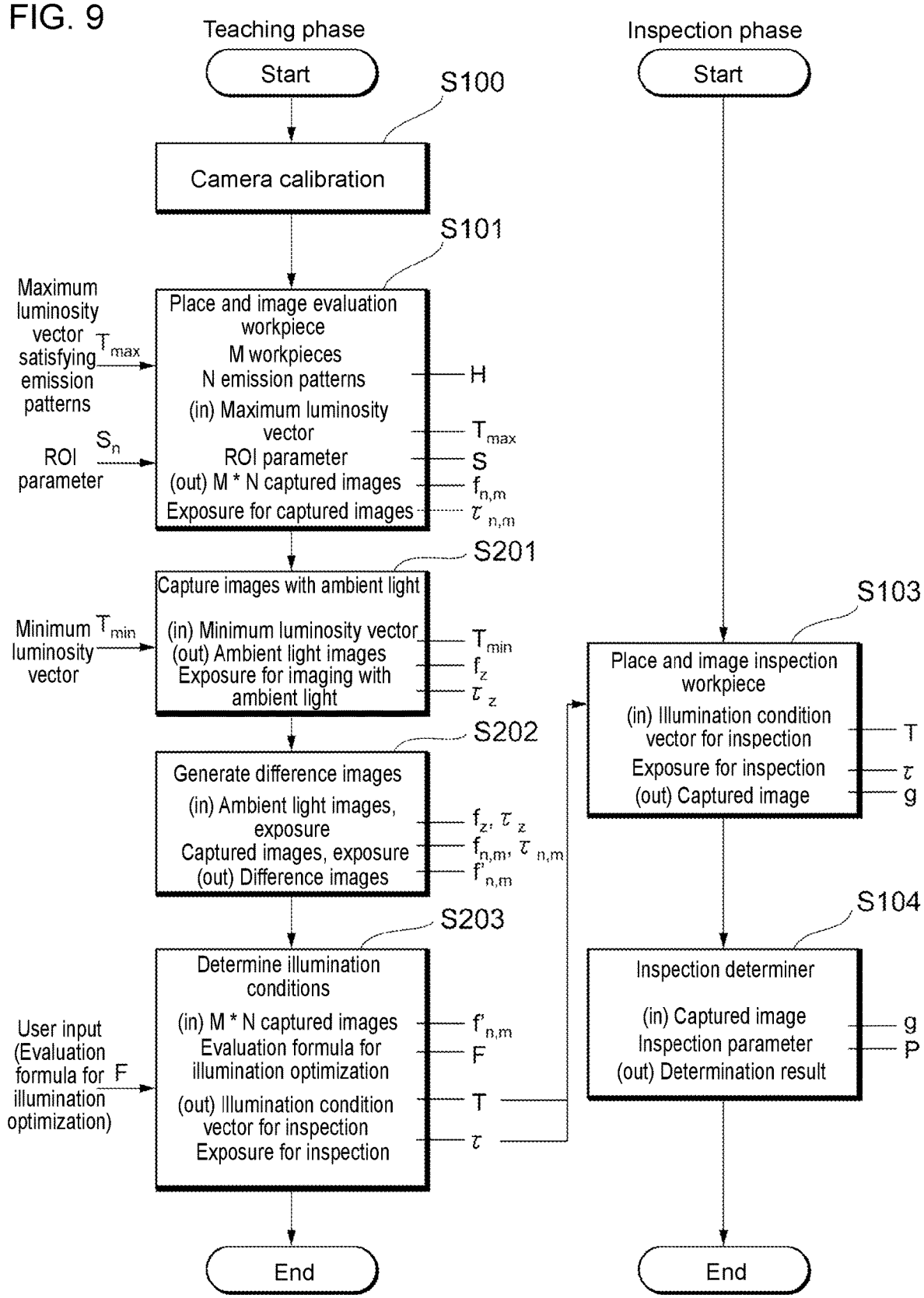
FIG. 9 is a flowchart of a process from determination of illumination conditions for the inspection system according to the embodiment of the present disclosure to inspection of a workpiece under the determined illumination conditions.

In the flowchart shown in FIG. 9, the teaching phase further includes determining the difference between an image captured with a maximum luminosity and an image (ambient light image) captured with a minimum luminosity to exclude the effects of ambient light more accurately.

More specifically, after N×M evaluation images $f_{n,m}$ are captured at the maximum luminosity in step S101, imaging is performed with ambient light alone (S201). More specifically, an ambient light image $f_z$ of each workpiece is captured under the condition of the minimum luminosity vector $T_{min}$ (e.g., with illumination turned off). The exposure time $T_z$ that causes no pixel saturation is used.

The inspection system 1 then generates difference images $f'_{n,m}$ that indicate the differences between the images $f_{n,m}$ captured at the maximum intensity obtained in step S101 and the ambient light image $f_z$ obtained in step S201 (S202).

Subsequently, the inspection system 1 determines illumination conditions (S203). The inspection system 1 receives an input of an evaluation formula F for illumination optimization from the user, evaluates, with the evaluation formula F, the N×M difference images $f'_{n,m}$ obtained in step S202, and determines the optimal illumination condition vector T and the optimal exposure time T.

Figure 10:
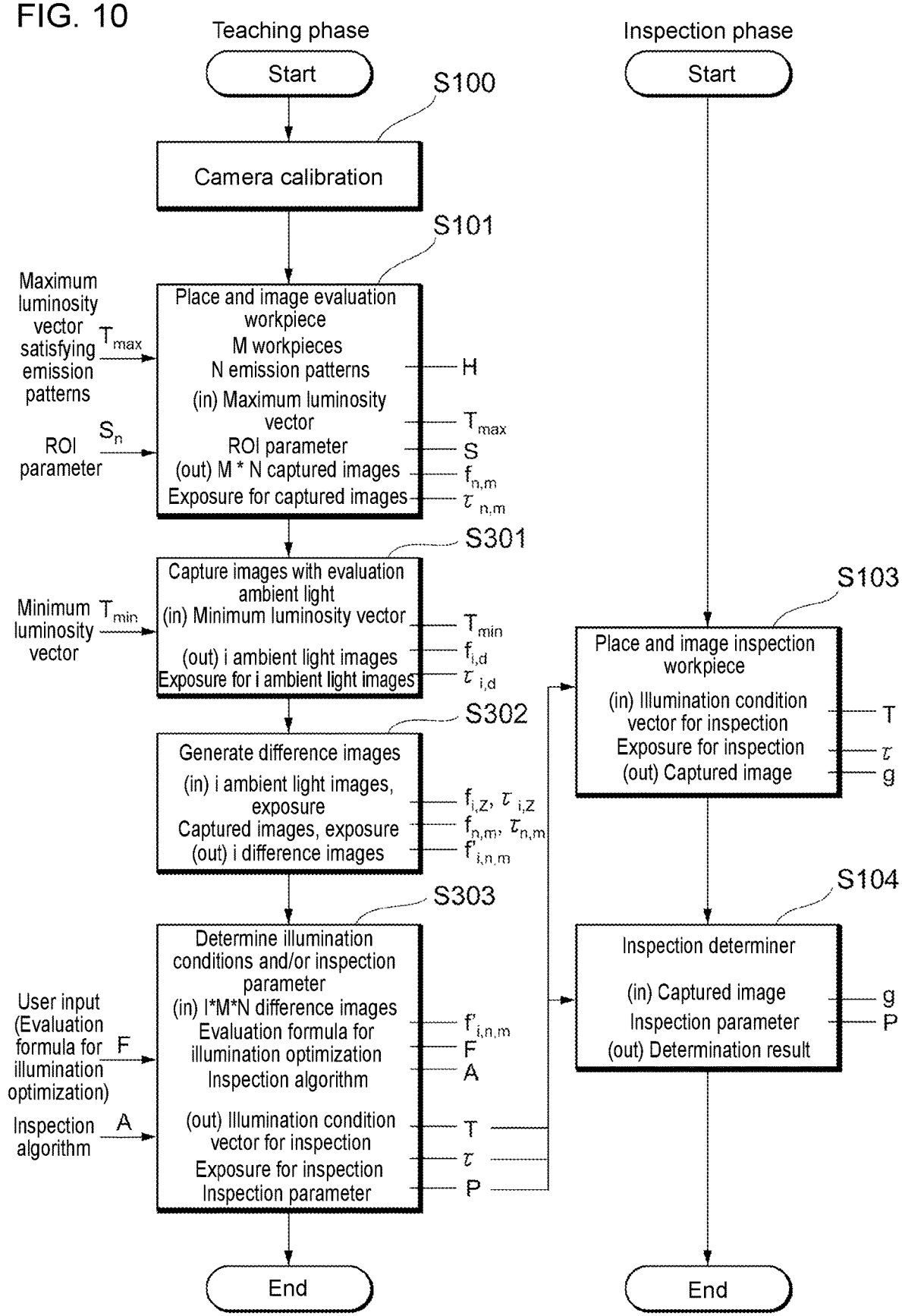
FIG. 10 is a flowchart of a process from determination of illumination conditions for the inspection system according to the embodiment of the present disclosure to inspection of a workpiece under the determined illumination conditions.

Tuning Illumination Conditions and Inspection Parameters Based on Multiple Ambient Light Images In the flowchart shown in FIG. 9, the ambient light images are captured under the condition that ambient light is constant. In the flowchart shown in FIG. 10, ambient light images are captured under the condition that ambient light changes (e.g., due to changes in sunshine conditions over time).

More specifically, evaluation images $f_{n,m}$ of M workpieces are first captured at the maximum luminosity in step S101, and i ambient light images $f_{i,d}$ of each workpiece under different ambient light conditions are then captured under the condition of the minimum luminosity vector $f_{min}$ (S301). The exposure time for the ambient light images is an exposure time $T_{i,d}$ that causes no pixel saturation in each image.

The inspection system 1 then generates difference images $f'_{i,n,m}$ that indicate the differences between the images $f_{n,m}$ captured at the maximum luminosity obtained in step S101 and the ambient light images $f_{i,d}$ obtained in step S301 (S302). In this step, i difference images are generated for each workpiece.

The inspection system 1 then determines the illumination conditions, the inspection parameter, or both (S303). The inspection system 1 receives an input of an evaluation formula F and an inspection algorithm A for illumination optimization, evaluates, with the evaluation formula F and the inspection algorithm A, the i×N×M difference images $f'_{i,n,m}$ obtained in step S302, and determines the optimal illumination condition vector T, exposure time T, and inspection parameter P.

In the manner described above, Illumination conditions are determined using multiple ambient light images of the same workpiece captured under different ambient light conditions. This allows calculation of illumination conditions that are robust against changes of ambient light. The use of multiple ambient light images also allows search of an inspection parameter that is robust against changes of ambient light.

In the above example, the multiple ambient light images without being processed are used to determine the illumination conditions and the inspection parameter. In other examples, an ambient light model (e.g., a model including an image vector x with multidimensional normal distribution $N(\mu, \Sigma)$) may be used to generate multiple ambient light images by numerical computation to determine illumination conditions and an inspection parameter that are robust against ambient light. In such examples, $\mu=E[x]$ is a vector representing the mean of each pixel value of the multiple ambient light images, $\Sigma=E[(x-\mu)(x-\mu)^T]$ is the variance-covariance matrix between the pixels of the multiple ambient light images.

As described above, the structure according to the present embodiment sets, when imaging workpieces, a maximum luminosity with light from the illuminator and adjusts the exposure of the camera to avoid pixel saturation. This maximizes the intensity of illumination light and thus sufficiently reduces relative effects of ambient light.

For the camera with a nonlinear CRF, the camera is calibrated before determination of the exposure time for illumination at the maximum luminosity. This allows the exposure time to be adjusted independently of the characteristic of the camera with an unknown CRF.

The exposure time is optimized using the difference between the image captured with illumination at the maximum luminosity and the image captured with illumination at the minimum luminosity. This allows the exposure to be adjusted based on the image captured at the luminosity of light precisely from the illuminator alone.

The exposure time is optimized using the difference between the image captured with illumination at the maximum luminosity and the image captured with illumination at the minimum luminosity with ambient light under multiple different conditions. This allows the exposure to be adjusted with robustness against the conditions of ambient light in imaging.

In the above embodiment, the light from the illuminator at the maximum luminosity is used to adjust the exposure or gain of the camera. For light from the illuminator with a sufficiently higher luminosity than ambient light, the light from the illuminator may be set to a luminosity higher than or equal to a predetermined value, rather than to the maximum luminosity.

The embodiment of the present disclosure described in detail above is a mere example of the present disclosure in all respects. The embodiment may be variously modified or altered without deviating from the scope of the present disclosure. The above embodiment may be partially or entirely expressed in, but not limited to, the following forms.

Appendix 1

An imaging condition setting system (1), comprising:
an imager (102) configured to capture an image of a workpiece (4) being an inspection target;
an illuminator (LS) including a light source configured to illuminate the workpiece (4) with light; and
an imaging condition setter (100) configured to set an imaging condition to capture an image of the workpiece (4), the imaging condition setter (100) being configured to set, for the image captured with light from the illuminator (LS) to the workpiece (4) at a luminosity greater than or equal to a threshold, an exposure time of the imager (102) to cause a value of a pixel in a specific area of the image of the workpiece (4) to be within a specific range.

Appendix 2

The imaging condition setting system (1) according to appendix 1, wherein the imaging condition setter (100) sets, for the image captured with light from the illuminator (LS) to the workpiece (4) at a maximum luminosity, the exposure time of the imager (102) to cause the value of the pixel in the specific area of the image of the workpiece (4) to be within the specific range.

Appendix 3

The imaging condition setting system (1) according to appendix 1 or appendix 2, wherein the illuminator (LS) includes a plurality of light sources each with an adjustable luminosity, and the imaging condition setter (100) sets a luminosity of at least one of the plurality of light sources to a value greater than or equal to the threshold.

Appendix 4

The imaging condition setting system (1) according to any one of appendixes 1 to 3, wherein in response to values of pixels being nonlinear with respect to exposure of the imager, the imaging condition setter calibrates the imager before setting the exposure time.

Appendix 5

The imaging condition setting system (1) according to any one of appendixes 1 to 4, wherein the imaging condition setter (100) sets the exposure time of the imager (102) to cause the value of the pixel in the specific area of the image of the workpiece (4) to be within the specific range based on a difference between an image captured with light from the illuminator (LS) to the workpiece (4) at a luminosity greater than or equal to the threshold and an image captured with light from the illuminator (LS) to the workpiece (4) at a minimum luminosity.

Appendix 6

The imaging condition setting system (1) according to any one of appendixes 1 to 4, wherein the imaging condition setter (100) sets the exposure time of the imager (102) to cause the value of the pixel in the specific area of the image of the workpiece (4) to be within the specific range based on differences between an image captured with light from the illuminator (LS) to the workpiece (4) at a luminosity greater than or equal to the threshold and images captured with light from the illuminator (LS) to the workpiece (4) at a minimum luminosity under a plurality of different ambient light conditions.

Appendix 7

The imaging condition setting system (1) according to any one of appendixes 1 to 6, wherein the imaging condition setter (100) sets, for the image captured with at least one of a setting value of the luminosity of light from the illuminator (LS) to the workpiece (4), a measurement value of a luminosity of actual light from the illuminator (LS) to the workpiece (4), or a displayed luminosity on a display being greater than or equal to a predetermined threshold, the exposure time of the imager (102) to cause the value of the pixel in the specific area of the image of the workpiece to be within the specific range.

Appendix 8

An imaging condition setting method implementable with a computer (1) for determining an imaging condition to capture an image of a workpiece (4) being an inspection target, the method comprising:
setting, with the computer (1), a luminosity of light from an illuminator (LS) to the workpiece (4) to a value greater than or equal to a threshold;
capturing, with the computer (1), an image of the workpiece (4) using an imager (102) under a condition that the light is at the luminosity; and
setting, with the computer (1), based on the captured image of the workpiece (4), an exposure time of the imager (102) to cause a value of a pixel in a specific area of the image of the workpiece (4) to be within a specific range.

Appendix 9

A program executable by a computer (1) for determining an imaging condition to capture an image of a workpiece (4) being an inspection target, the program causing the computer (1) to perform operations comprising:
setting a luminosity of light from an illuminator (LS) to the workpiece (4) to a value greater than or equal to a threshold;
capturing an image of the workpiece (4) using an imager (102) under a condition that the light is at the luminosity; and
setting, based on the captured image of the workpiece (4), an exposure time of the imager (102) to cause a value of a pixel in a specific area of the image of the workpiece (4) to be within a specific range.

What is claimed is:

1. An imaging condition setting system, comprising:
an imager configured to capture an image of a workpiece being an inspection target;
an illuminator including a light source configured to illuminate the workpiece with light; and
an imaging condition setter configured to set an imaging condition to capture an image of the workpiece, the imaging condition setter being configured to set, for the image captured with light from the illuminator to the workpiece at a luminosity greater than or equal to a threshold, an exposure time of the imager to cause a value of a pixel in a specific area of the image of the workpiece to be within a specific range, wherein the imaging condition setter sets the exposure time of the imager to cause the value of the pixel in the specific area of the image of the workpiece to be within the specific range based on a difference between an image captured with light from the illuminator to the workpiece at a luminosity greater than or equal to the threshold and an image captured with light from the illuminator to the workpiece at a minimum luminosity.

2. The imaging condition setting system according to claim 1, wherein the imaging condition setter sets, for the image captured with light from the illuminator to the workpiece at a maximum luminosity, the exposure time of the imager to cause the value of the pixel in the specific area of the image of the workpiece to be within the specific range.

3. The imaging condition setting system according to claim 1, wherein the illuminator includes a plurality of light sources each with an adjustable luminosity, and the imaging condition setter sets a luminosity of at least one of the plurality of light sources to a value greater than or equal to the threshold.

4. The imaging condition setting system according to claim 1, wherein in response to values of pixels being nonlinear with respect to exposure of the imager, the imaging condition setter calibrates the imager before setting the exposure time.

5. An imaging condition setting system, comprising:
an imager configured to capture an image of a workpiece being an inspection target;
an illuminator including a light source configured to illuminate the workpiece with light; and
an imaging condition setter configured to set an imaging condition to capture an image of the workpiece, the imaging condition setter being configured to set, for the image captured with light from the illuminator to the workpiece at a luminosity greater than or equal to a threshold, an exposure time of the imager to cause a value of a pixel in a specific area of the image of the workpiece to be within a specific range, wherein the imaging condition setter sets the exposure time of the imager to cause the value of the pixel in the specific area of the image of the workpiece to be within the specific range based on differences between an image captured with light from the illuminator to the workpiece at a luminosity greater than or equal to the threshold and images captured with light from the illuminator to the workpiece at a minimum luminosity under a plurality of different ambient light conditions.

6. The imaging condition setting system according to claim 5, wherein the imaging condition setter sets, for the image captured with light from the illuminator to the workpiece at a maximum luminosity, the exposure time of the imager to cause the value of the pixel in the specific area of the image of the workpiece to be within the specific range.

7. The imaging condition setting system according to claim 5, wherein the illuminator includes a plurality of light sources each with an adjustable luminosity, and the imaging condition setter sets a luminosity of at least one of the plurality of light sources to a value greater than or equal to the threshold.

8. The imaging condition setting system according to claim 5, wherein in response to values of pixels being nonlinear with respect to exposure of the imager, the imaging condition setter calibrates the imager before setting the exposure time.

9. An imaging condition setting system, comprising:
an imager configured to capture an image of a workpiece being an inspection target;
an illuminator including a light source configured to illuminate the workpiece with light; and
an imaging condition setter configured to set an imaging condition to capture an image of the workpiece, the imaging condition setter being configured to set, for the image captured with light from the illuminator to the workpiece at a luminosity greater than or equal to a threshold, an exposure time of the imager to cause a value of a pixel in a specific area of the image of the workpiece to be within a specific range, wherein the imaging condition setter sets, for the image captured with at least one of a setting value of the luminosity of light from the illuminator to the workpiece, a measurement value of a luminosity of actual light from the illuminator (LS) to the workpiece, or a displayed luminosity on a display being greater than or equal to a predetermined threshold, the exposure time of the imager to cause the value of the pixel in the specific area of the image of the workpiece to be within the specific range.

10. The imaging condition setting system according to claim 9, wherein the imaging condition setter sets, for the image captured with light from the illuminator to the workpiece at a maximum luminosity, the exposure time of the imager to cause the value of the pixel in the specific area of the image of the workpiece to be within the specific range.

11. The imaging condition setting system according to claim 9, wherein the illuminator includes a plurality of light sources each with an adjustable luminosity, and the imaging condition setter sets a luminosity of at least one of the plurality of light sources to a value greater than or equal to the threshold.

12. The imaging condition setting system according to claim 9, wherein in response to values of pixels being nonlinear with respect to exposure of the imager, the imaging condition setter calibrates the imager before setting the exposure time.

13. An imaging condition setting method implementable with a computer for determining an imaging condition to capture an image of a workpiece being an inspection target, the method comprising:
setting, with the computer, a luminosity of light from an illuminator to the workpiece to a value greater than or equal to a threshold;
capturing, with the computer, an image of the workpiece using an imager under a condition that the light is at the luminosity; and
setting, with the computer, based on the captured image of the workpiece, an exposure time of the imager to cause a value of a pixel in a specific area of the image of the workpiece to be within a specific range; wherein an imaging condition setter sets the exposure time of the imager to cause the value of the pixel in the specific area of the image of the workpiece to be within the specific range based on a difference between an image captured with light from the illuminator to the workpiece at a luminosity greater than or equal to the threshold and an image captured with light from the illuminator to the workpiece at a minimum luminosity.

14. A non-transitory computer readable storage medium configured to perform operations comprising:
setting a luminosity of light from an illuminator to the workpiece to a value greater than or equal to a threshold;
capturing an image of the workpiece using an imager under a condition that the light is at the luminosity; and
setting, based on the captured image of the workpiece, an exposure time of the imager to cause a value of a pixel in a specific area of the image of the workpiece to be within a specific range; wherein an imaging condition setter sets the exposure time of the imager to cause the value of the pixel in the specific area of the image of the workpiece to be within the specific range based on a difference between an image captured with light from the illuminator to the workpiece at a luminosity greater than or equal to the threshold and an image captured with light from the illuminator to the workpiece at a minimum luminosity.

\* \* \* \* \*